April 2, 1940. P. RICCOBENE 2,195,497
APPARATUS FOR MAKING SHOE SHANKS
Filed Dec. 6, 1938 3 Sheets-Sheet 1
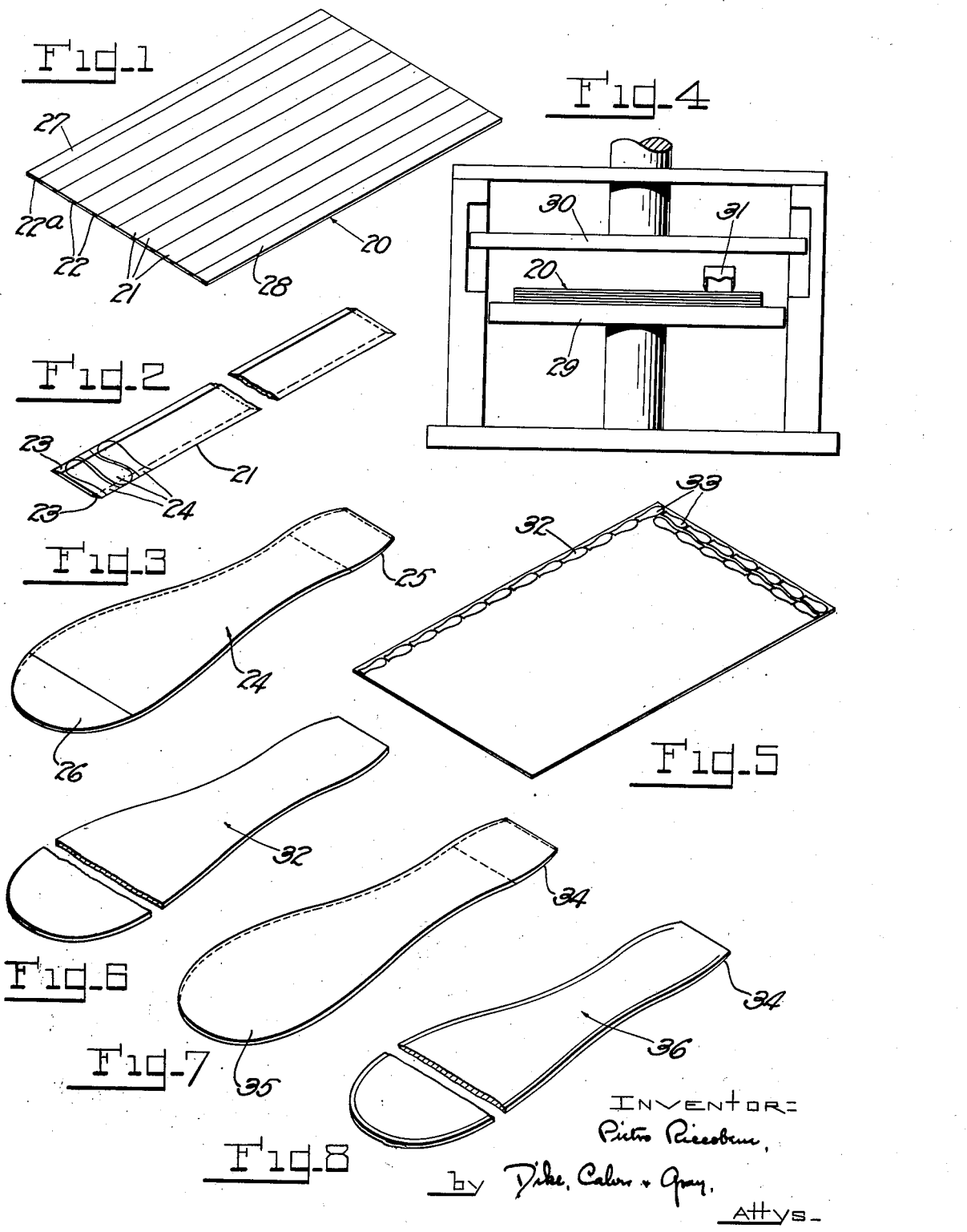

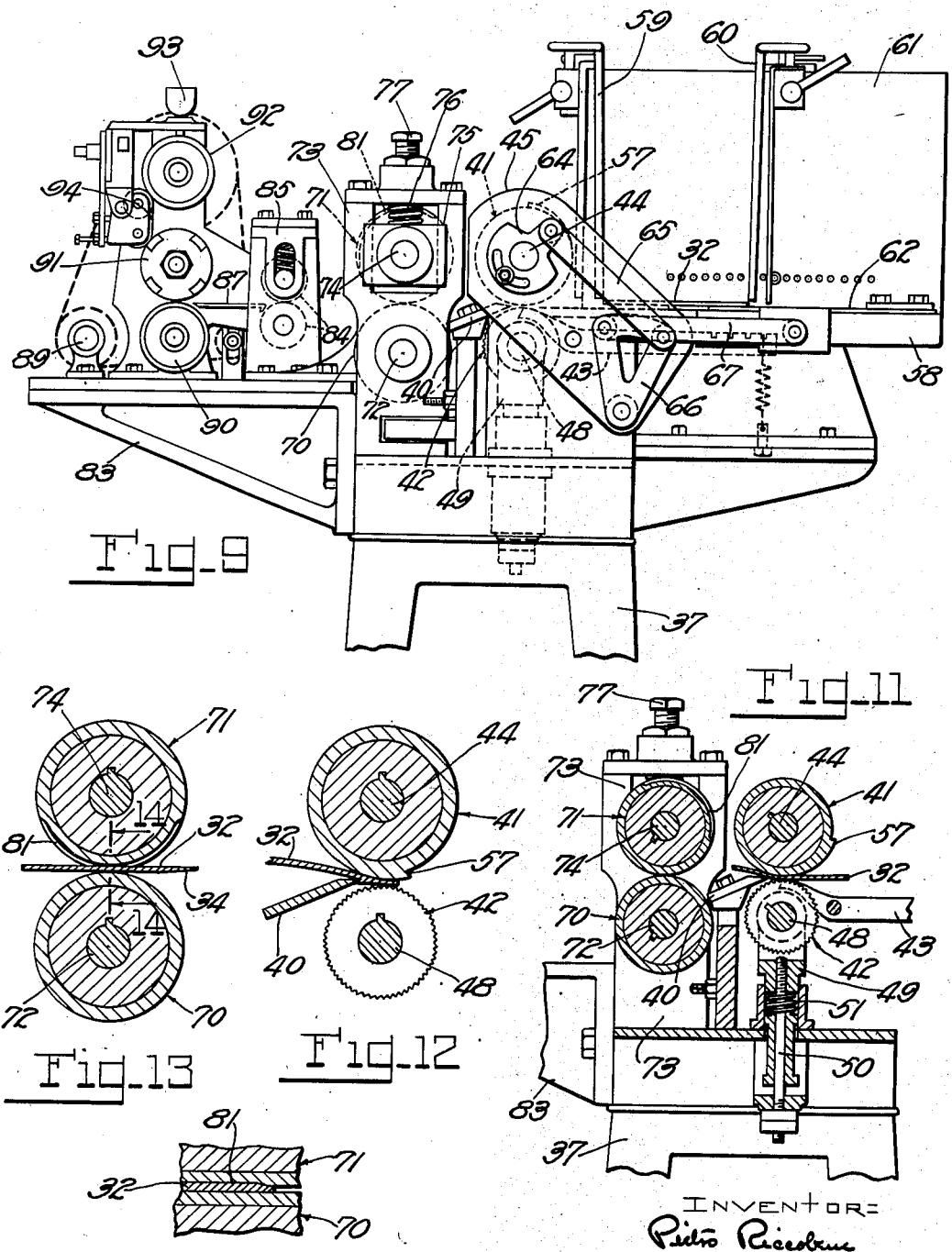

April 2, 1940.  P. RICCOBENE  2,195,497
APPARATUS FOR MAKING SHOE SHANKS
Filed Dec. 6, 1938  3 Sheets-Sheet 3
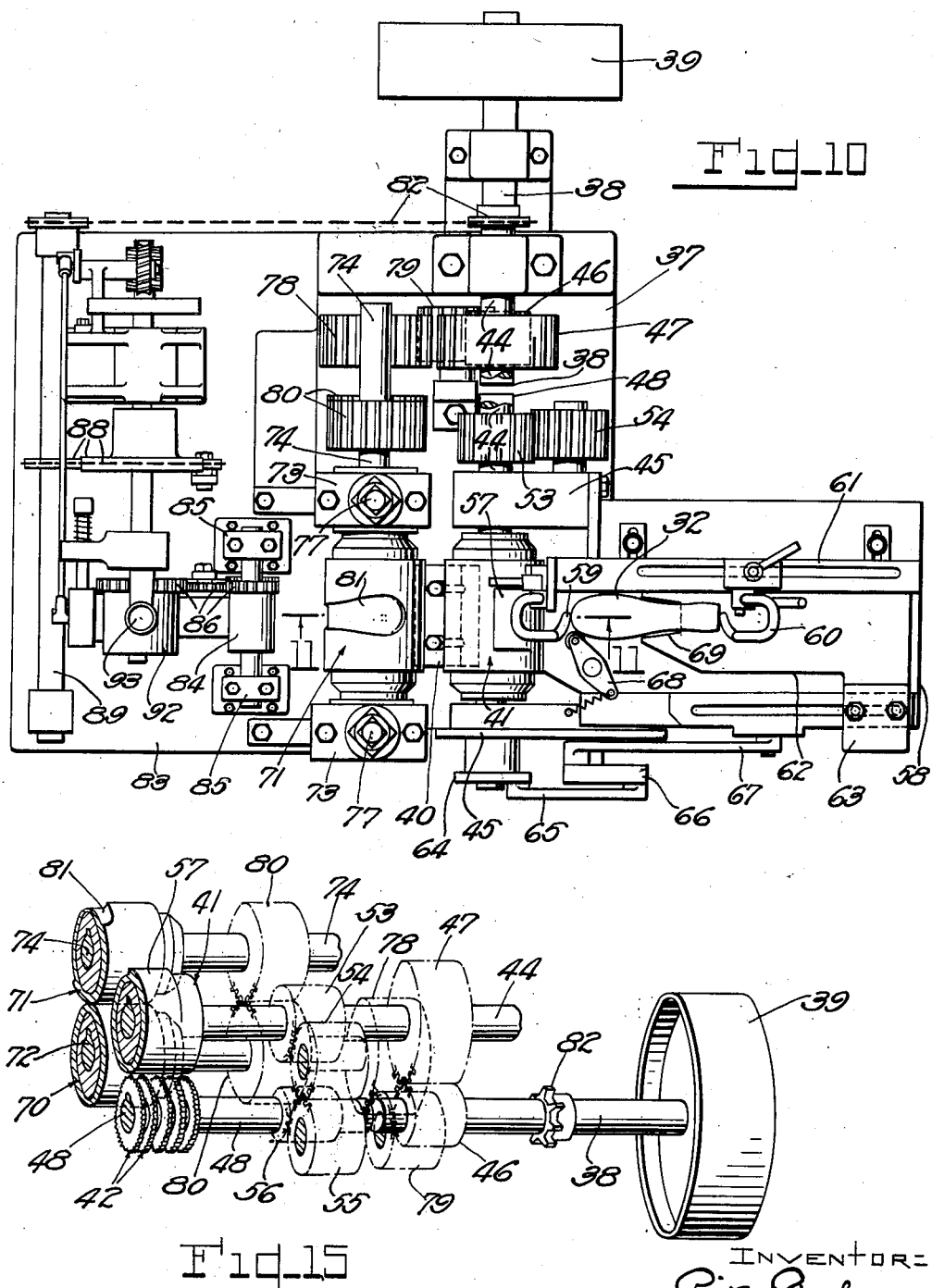

Patented Apr. 2, 1940

2,195,497

UNITED STATES PATENT OFFICE 2,195,497

APPARATUS FOR MAKING SHOE SHANKS

Pietro Riccobene, Boston, Mass.

Application December 6, 1938, Serial No. 244,238

3 Claims. (Cl. 12—60)

This invention relates to a process of and machine for making shanks for shoes, and more particularly for making shanks from heavy fibre board. My invention greatly increases the production of such shanks.

Heretofore, as far as I am aware, fibre board shanks have been made from large sheets of fibre board about 36 x 42 inches. One sheet at a time is cut into strips about 5½ inches wide, one strip at a time, by passing it through a slitting machine, which cuts the strips at a flat or sharp angle, thus presenting a flatly bevelled edge on each opposite side of the strip. The strips are then taken to a dinking machine where shank blanks are cut from the strip with a dinking die, the operator turning the sheet alternately with each cut to save material. The blanks are then passed through pressing rolls in the same machine, which press down the edges of the shanks, and can be marked with ink, if desired, to show size, model numbers, trademarks, etc. The total production of the two machines (one operator on each) is about 18,000 to 19,000 pieces per eight-hour day. Approximately two hours are lost each time the dinking machine is stopped to sharpen and replace the die. By this method, approximately 150 blanks can be cut from each sheet of fibre board, two inches of material being lost in the first cut of a strip and on the last cut whatever fraction of material is left over is also lost. The blank in the dinking machine is frequently gouged by the feeding device which digs into the shank to feed it into the pressing rolls, thus marring its appearance to some extent.

By my invention, the slitting or stripping operation is eliminated, and six or seven large sheets at a time are placed on a clicker machine, the operator placing the clicker die on the sheet as desired, turning the die alternately to save material, and even narrow fractional strips are not wasted, as blanks are cut lengthwise from them. The blanks are then taken to a new machine forming part of my invention, where the instep end of the shank blank is skived, the edges are pressed down, and the marking performed. The total production of the two machines (one operator on each) is 40,000 to 50,000 pieces per eight-hour day. By my method approximately 180 blanks can be cut from each sheet of fibre board, no material large enough for a blank being wasted. The blank is not gouged or marred in any way by the feeding mechanism of my machine. My new machine can also be used for skiving counters, by proper modfications, thus eliminating the necessity of a separate counter skiving machine in small shoe factories.

Before explaining in detail the present invention it is to be understood that the invention is not limited in its application to the details of construction and arrangement of parts illustrated in the accompanying drawings, since the invention is capable of other embodiments and of being practised or carried out in various ways. Also it is to be understood that the phraseology or terminology employed herein is for the purpose of description and not of limitation, and it is not intended to limit the invention claimed herein beyond the requirements of the prior art.

In the accompanying drawings:

Figs. 1 to 3 are diagrammatic views illustrating the method heretofore usually employed in making shank pieces; Fig. 1 being a perspective view of a sheet of material, showing the manner of cutting the same into strips; Fig. 2 an enlarged perspective view, partly broken away, of one of the strips showing the manner of cutting the shank pieces therefrom; and Fig. 3 a further enlarged perspective view of one of the resulting shank pieces.

Figs. 4 to 8 are diagrammatic views illustrating the improved method of the present invention; Fig. 1 being a front elevation of a clicking machine and Fig. 2 a perspective view of one of the sheets of stock, showing the manner of dieing out the blanks from the latter; and Figs. 6 to 8 being enlarged perspective views, some partly broken away, showing several steps in the conversion of a died out blank into a completed shank.

Fig. 9 is a side elevation and Fig. 10 a plan view of a machine suitable for carrying out the improved method and likewise constituting a portion of the invention.

Fig. 11 is a vertical section taken substantially on the line 11—11, Fig. 10.

Fig. 12 is a diagrammatic view of the skiving mechanism showing the skiving operation.

Fig. 13 is a similar view of the compressing and molding mechanism showing the molding operation.

Fig. 14 is a detail section taken substantially on the line 14—14, Fig. 13.

Fig. 15 is a fragmentary and somewhat diagrammatic perspective view of certain parts of the driving connections.

In order to make clear the important advantages of the present invention, the method heretofore generally practiced in the manufacture of shoe shank pieces is diagrammatically illustrated in Figs. 1, 2 and 3. In accordance with this prior method, a sheet of fibre or other stock 20 (Fig. 1) is divided into strips 21 by oblique cuts 22 forming sharply acute angles with the surfaces of the sheet, so that the strips 21 have flatly and oppositely bevelled or chamfered lateral edges 23. The individual strips so formed are then progressively fed into a dinking machine in which shank pieces 24 are successively died or stamped out as shown in Fig. 2, the operator turning the strip over between successive stamping operations, so that alternate shank pieces are cut from the strip in oppositely disposed relation in order to reduce waste of stock. This turning of the strip between the dieing out of successive shank pieces renders this operation relatively slow and correspondingly curtails the production, as does also the necessity of shutting down the machine from time to time in order to remove the die for sharpening purposes. The bevelling of the edges of the strips is necessary in order that the shank pieces may have the required thin forward ends 25 (Fig. 3), but, since both edges are similarly bevelled, it results in the formation of shanks whose rear or heel extremities 26 are likewise thinner than the intermediate portions, which is not usually desirable. Moreover, the slitting of the sheet into strips as above described results in considerable waste of stock. In making the first oblique cut 22a a strip 27 at one edge of the sheet 20 is wasted, and, since the width of said sheet is seldom commensurate with the width of the several strips 21, a second strip 28 at the opposite edge of the sheet, of greater or less width, is likewise wasted.

In accordance with my improved method, a plurality of superimposed sheets of stock 20, preferably from six to ten, are placed on the bed 29 of a clicking machine (Fig. 4) which may be of the type customarily employed for dieing out soles and other shoe parts and comprising a ram or head 30 for forcing a cutting die 31 through the superimposed sheets. The die 31 is of a suitable shape to cut out shank blanks 32 (Figs. 5 and 6) of the required outline, a plurality of such blanks, corresponding in number to the number of sheets 20, being formed at each operation of the machine and without inverting the stock, resulting in very rapid production. Between successive strokes, the operator moves and positions the die in such a manner as to utilize the stock in the most economical manner, it being possible, since there is no slitting of the sheets, to use up substantially the whole of the latter with minimum waste, as by dieing out some of the blanks at right angles to others, as indicated at 33 in Fig. 5. In this manner, it has been found possible, in practice, to cut about 20% more blanks from a sheet of material of the usual size than could be done by the old method. Since the die 31 is not a unitary part of the machine, but is merely manipulated and positioned by the operator, practically no time is lost in changing dies for sharpening purposes or otherwise. The blanks 32, having been cut from sheets of substantially uniform thickness, are likewise of uniform thickness throughout, and to provide them with the desired thin forward or instep ends, it is only necessary to skive them at said ends, as shown at 34 in Fig. 7, the rear or heel ends 35 being, however, left intact and of the full original thickness of the material. Finally, the skived blanks are compressed and molded in suitable dies to form the finished shanks 36 (Fig. 8) which may be marked or impressed in any suitable way for purposes of identification or otherwise.

The invention also includes the provision of improved mechanism for skiving and molding the blanks, and for marking the finished shanks, whereby these operations can be effectually performed under the control of a single operator as rapidly as the blanks can be died out on the clicking machine. This mechanism is shown in Figs. 9 to 15.

Referring particularly to Fig. 10, the frame 37 of the machine has journalled therein a power shaft 38 (see also Fig. 15) to which power from any suitable source may be applied through a belt pulley 39, and from which the several mechanisms of the machine are driven through connections hereinafter described. These mechanisms include skiving mechanism for skiving the ends of the blanks 32, feeding mechanism for feeding the blanks to the skiving mechanism, molding and compressing mechanism arranged to receive the skived blanks from the skiving mechanism and form them into finished shanks, and marking or impressing mechanism to which the shanks are fed from the molding mechanism.

The skiving mechanism, as to its general organization, is similar to that described in the patent to Malaguti, No. 1,555,136, September 29, 1925, but with important differences hereafter pointed out. Said mechanism comprises a skiving knife 40 (Figs. 9, 10, 11 and 12) adjustably mounted in the machine frame and to which a blank is fed by cooperating devices adapted to grip and advance the blank, said devices including an upper skiving roll 41 (see also Fig. 15), and a lower coaxial series of serrated disks 42 between which are located a series of spring pressed fingers 43 (see particularly Figs. 9 and 11). The skiving roll 41 is mounted on a shaft 44 journalled in upright portions 45 of the frame and driven at a reduced speed from the shaft 38 by gears 46 and 47 on said shafts 38 and 44, respectively. The disks 42 are secured to a shaft 48 journalled in a yoke 49 (see particularly Fig. 11) having a shank 50 guided for vertical movement in the frame and urged upwardly by a spring 51 acting to press said disks toward the roll 41. The shaft 48, which is normally substantially in alinement with the shaft 38, although spaced slightly therefrom as shown at 52 in Fig. 15, is driven from the shaft 44 through gears 53, 54, 55 and 56 so designed as to cause said disks to travel at the same peripheral speed as the roll 41. The surface of the roll 41 is for the most part cylindrical but is formed with a relatively short raised portion 57 of progressively increasing height. The arrangement is such that, as the blanks pass endwise between the roll 41 and the disks 42 with their heel ends foremost, the cylindrical portion of said roll, in conjunction with the disks 42 and fingers 43, will guide said blanks clear of the knife 40, as shown in Fig. 11, but as the instep end of a blank is fed to the knife the raised portion 57 will progressively depress the same (the disks 42 yielding against the pressure of the spring 51 for this purpose), as shown in Fig. 12, to skive or bevel said end as shown at 34 in Fig. 7.

The blanks are fed to the skiving mechanism over a feed table 58 (Figs. 9 and 10) forming a part of the machine frame from a hopper comprising uprights 59 and 60, the latter of which is adjustably secured, in accordance with the size of the blank, to an upright wall 61 rising from said feed table, by means of a feed slide 62 guided, as shown at 63 in Fig. 10, on the edge of said feed table. Said slide is reciprocated from a crank 64 adjustably secured to the shaft 44 and connected by a link 65 with a rocker 66 pivoted to the frame and connected by a second link 67 with said slide. This mechanism is likewise generally similar to that shown in the Malaguti patent above referred to with such modification as is necessary to adapt it to the present purpose. The blanks 32, as they are progressively fed from the bottom of the stack in the hopper by the slide 62, are guided between the upright wall 61 and a spring pressed guide lever 68 (Fig. 10), the slide 62 being formed with a notch 69 shaped to fit the instep or narrow ends of said blanks. It will be understood that the slide 62 is reciprocated in such synchronism with the skiving roll 41 that the forward or heel ends of successive blanks pass between said roll and the disks 42 immediately after the raised portion 57 has passed said disks.

The molding or pressing mechanism comprises a pair of rolls 70 and 71, the former of which is mounted on a shaft 72 journalled in fixed bearings in upright portions 73 of the machine frame, and the latter of which is carried by a shaft 74 journalled in bearing blocks 75 (see particularly Fig. 9) guided for vertical movement in the upright portions 73 and normally pressed toward the roll 70 by springs 76 adjustably stressed by means of abutment screws 77. The shaft 72 is driven from the gear 46 on the shaft 38 through a gear 78 fast on said shaft 72 and an intermediate idler gear 79, while the shafts 72 and 74 are connected for rotation in unison by intermeshing gears 80. The rolls 70 and 71 are arranged to receive the skived blanks as they are delivered from the skiving mechanism and to grip said blanks between them in such a manner as to continue the feeding thereof. The roll 71 is formed with a molding cavity 81 of such form that, as the skived blank is fed between said rolls, it will be molded and compressed to form the finished shank 36. It will be obvious that instead of forming the roll 70 alone with the molding cavity 81, the rolls 70 and 71 may, if desired, be formed with complementary molding cavities.

The adjustable spring pressed mounting of the bearing blocks 75 permits the molding pressure to be adjusted and also permits the roll 71 to yield in the event of jamming of the mechanism, as in case a blank is improperly fed, thereby preventing stripping of the gears or other damage to the mechanism. It also has another important advantage. It will be observed that, by the simple expedient of replacing the skiving roll 41 by another skiving roll of suitable shape, and by suitable adjustment of the hopper uprights 59 and 60, and the substitution of another feed slide 62 of proper form, the same machine can be used for skiving counters, as described in the Malaguti patent, above referred to, or other shoe parts, thereby making it possible in small shops to use the same machine for a variety of purposes. When the machine is set up for skiving counters, for example, the molding roll 71 can, if desired, be replaced by a plain cylindrical feed roll, but this, in the mechanism shown, is not necessary since, by relieving the pressure on the spring 76 by suitable adjustment of the abutment screw 77, the rolls 70 and 71 may be caused to grip the blanks with only sufficient tightness to feed them forward without exerting any molding pressure thereon.

Beyond the molding mechanism, and adapted to receive the completed blanks 36 from the latter and to continue their feeding through and out of the machine, there is preferably provided marking, printing or impressing mechanism supported by a rearward extension 83 (Fig. 9) of the machine frame and driven by chain and sprocket gearing 88 (Fig. 10) from a shaft 89 which in turn is driven through chain and sprocket gearing 82 from the shaft 38, said mechanism including an impression roll 90, a printing roll 91, and an inking roll 92 to which ink is delivered from a reservoir 93 and from which it is transferred to the printing roll by suitable distributing or spreading devices 94. This mechanism may, as to its essential construction, arrangement and operation, be substantially as shown and described in the Malaguti patent above referred to and therefore does not require description in detail. In the present instance, however, and for convenience, there is preferably provided a pair of feed rolls 84 suitably, and preferably relatively yieldingly, journalled in uprights 85 rising from the extension 83 and driven by suitable spur gearing, generally indicated at 86 in Fig. 10, from the printing or impressing mechanism, said feed rolls being adapted to receive the finished shanks from the molding mechanism and to deliver them over a feed table 87 to said printing or impressing mechanism.

I claim:

1. In a machine for skiving shoe shanks, in combination, a knife and feeding mechanism in advance of said knife for feeding a shank blank to the latter, said mechanism including a roll and yieldingly mounted cooperating means adapted, in conjunction with said roll, to grip and advance a blank, said roll having a cylindrical surface adapted to guide the blank, as it is fed, clear of the edge of the knife and having a raised portion adapted to engage an end of the blank and, by displacement of said cooperating means, force it into engagement with said edge to skive the same.

2. In a machine for skiving shoe shanks, in combination, a knife, a roll, and yieldingly mounted cooperating means adapted, in conjunction with said roll, to grip a shank blank and feed it endwise to said knife, said roll having a cylindrical surface adapted to guide the blank, as it is fed, clear of the edge of the knife and having a raised portion of progressively increasing height adapted to engage an end of the blank and, by displacement of said cooperating means, force it into engagement with said edge to skive the same.

3. In a machine for making shoe shanks, the combination with mechanism for skiving the end of a shank blank comprising a knife and means for feeding the blank past said knife and controlling its engagement therewith, of molding mechanism located beyond said knife and comprising a pair of cooperating molding rolls adapted to grip between them the skived blank as it is delivered by said feeding means and continue the feeding thereof while molding the same, and marking mechanism adapted to receive the molded blank from said molding mechanism and further continue the feeding thereof while marking the same.

PIETRO RICCOBENE.